US 8,997,721 B2

(12) United States Patent
Yamamoto

(10) Patent No.: US 8,997,721 B2
(45) Date of Patent: Apr. 7, 2015

(54) INTAKE APPARATUS OF ENGINE

(71) Applicant: Toshihiko Yamamoto, Kamakura (JP)

(72) Inventor: Toshihiko Yamamoto, Kamakura (JP)

(*) Notice: Subject to any disclaimer, the term of this patent is extended or adjusted under 35 U.S.C. 154(b) by 10 days.

(21) Appl. No.: 13/740,162

(22) Filed: Jan. 12, 2013

(65) Prior Publication Data
US 2013/0125861 A1 May 23, 2013

Related U.S. Application Data

(63) Continuation-in-part of application No. 13/274,579, filed on Oct. 17, 2011.

(30) Foreign Application Priority Data

Aug. 30, 2011 (JP) ................. 2011-187396

(51) Int. Cl.
F02M 29/00 (2006.01)
F02M 29/04 (2006.01)
F02B 31/00 (2006.01)
F02M 69/00 (2006.01)
F02M 57/00 (2006.01)
F02M 35/10 (2006.01)

(52) U.S. Cl.
CPC .............. F02M 69/00 (2013.01); F02M 57/00 (2013.01); F02M 35/10281 (2013.01); F02M 35/10327 (2013.01); F02M 29/04 (2013.01)

(58) Field of Classification Search
CPC ........ F02F 1/4242; F02F 1/425; F02M 29/04; F02B 31/04; F02B 31/06; F02B 31/08
USPC ............. 123/306, 308, 593, 597, 184.56, 590
See application file for complete search history.

(56) References Cited

U.S. PATENT DOCUMENTS

| | | | | | |
|---|---|---|---|---|---|
| 1,382,285 | A | * | 6/1921 | Harris | 123/556 |
| 1,503,371 | A | * | 7/1924 | Meyer | 48/189.4 |
| 2,377,088 | A | * | 5/1945 | Linn | 48/189.4 |
| 3,414,242 | A | * | 12/1968 | Bouteleux | 261/18.3 |
| 3,982,504 | A | * | 9/1976 | Noguchi et al. | 123/260 |
| 4,114,580 | A | * | 9/1978 | Coats | 123/593 |
| 4,295,458 | A | * | 10/1981 | Pellerin | 48/189.4 |
| 4,359,035 | A | * | 11/1982 | Johnson | 123/593 |
| 4,384,563 | A | * | 5/1983 | Siefer et al. | 123/593 |
| 4,492,212 | A | * | 1/1985 | Dooley | 123/590 |
| 4,667,648 | A | * | 5/1987 | Beldin | 123/593 |
| 5,027,754 | A | * | 7/1991 | Morone | 123/184.54 |
| 5,758,614 | A | * | 6/1998 | Choi | 123/184.53 |
| 5,915,354 | A | * | 6/1999 | Ma | 123/308 |
| 5,924,398 | A | * | 7/1999 | Choi | 123/184.21 |
| 6,076,499 | A | * | 6/2000 | Klumpp | 123/337 |
| 6,257,212 | B1 | * | 7/2001 | Hammond | 123/557 |
| 6,612,295 | B2 | * | 9/2003 | Lerner | 123/593 |
| 6,874,465 | B2 | * | 4/2005 | Arimatsu et al. | 123/306 |
| 7,131,514 | B2 | * | 11/2006 | Choi et al. | 181/270 |
| 7,322,333 | B2 | * | 1/2008 | Isaji et al. | 123/184.59 |

(Continued)

Primary Examiner — Hieu T Vo
Assistant Examiner — Sherman Manley
(74) Attorney, Agent, or Firm — Tracy M Heims; Apex Juris, Pllc

(57) ABSTRACT

An intake apparatus of an engine provided with a fuel supply device for supplying fuel into an intake passage. A guide body is disposed in the intake passage located downstream from the fuel supply device, and the guide body may have at least one hole. The volume ratio of the guide body relative to the intake passage range and the volume ratio of the total holes relative to the guide body are ranged in the preferable volume percent.

25 Claims, 17 Drawing Sheets

(56) References Cited

U.S. PATENT DOCUMENTS

| | | | |
|---|---|---|---|
| 7,367,329 B2 * | 5/2008 | Yamamoto | 123/590 |
| 7,458,344 B2 * | 12/2008 | Holtorf | 123/73 PP |
| 7,762,229 B2 * | 7/2010 | Abe et al. | 123/306 |
| 8,051,846 B2 * | 11/2011 | Sugishita | 123/590 |
| 8,141,538 B2 * | 3/2012 | Yang | 123/308 |
| 8,166,775 B2 * | 5/2012 | Choi | 62/426 |
| 2001/0050075 A1 * | 12/2001 | Lerner | 123/593 |
| 2004/0065296 A1 * | 4/2004 | Arimatsu et al. | 123/308 |
| 2004/0089271 A1 * | 5/2004 | Nagano et al. | 123/470 |
| 2005/0081821 A1 * | 4/2005 | Katou et al. | 123/308 |
| 2006/0219202 A1 * | 10/2006 | Abe et al. | 123/184.56 |
| 2006/0231067 A1 * | 10/2006 | Masuta et al. | 123/308 |
| 2007/0044780 A1 * | 3/2007 | Yamamoto | 123/593 |
| 2009/0272356 A1 * | 11/2009 | Abe et al. | 123/184.56 |
| 2010/0147242 A1 * | 6/2010 | Yang | 123/184.21 |
| 2013/0047960 A1 * | 2/2013 | Yamamoto | 123/445 |
| 2013/0125861 A1 * | 5/2013 | Yamamoto | 123/445 |

* cited by examiner

INTAKE APPARATUS OF ENGINE

REFERENCE TO PRIOR APPLICATION

This application is a continuation-in-part of prior application Ser. No. 13/274,579, filed on Oct. 17, 2011, which claims priority benefit of the original foreign filed application number 2011-187396, filed on Aug. 30, 2011 in Japan.

BACKGROUND OF THE INVENTION

1. Field of the Invention

The present disclosure relates to an intake apparatus of an engine provided with a fuel supplying device for supplying fuel into an intake passage.

2. Description of the Related Art

Heretofore, examples of an engine mounted on or within a vehicle such as a two-wheeled motor vehicle include a 2-stroke engine and a 4-stroke engine, and such an engine is provided with an intake apparatus. As for the intake apparatus, there is one provided with a fuel supplying device for supplying fuel into an intake passage (Japanese Patent Application Laid-Open No. H07-317613).

Such an intake apparatus is supplied with a mixture of air and fuel. To improve the filling efficiency of the air-fuel mixture, there is an intake apparatus in which a straightening plate or the like is arranged in the intake passage. However, just straightening the air-fuel mixture by the straightening plate in this manner does not bring about sufficient atomization of the air-fuel mixture and sufficient reduction in harmful components in exhaust gas.

The present disclosure has been made with the view to such circumstances, and an object of the present disclosure is to provide an intake apparatus of an engine that improves an atomizing rate of an air-fuel mixture, improves combustion efficiency and fuel consumption, and reduces harmful components in exhaust gas.

SUMMARY OF THE INVENTION

To solve the above problems and to achieve the object noted above, the present disclosure is configured as follows.

A first aspect of the present disclosure is an intake apparatus of an engine provided with a fuel supplying device for supplying fuel into an intake passage, the intake apparatus including: a guide body having multiple holes disposed in the intake passage located downstream from the fuel supplying device, wherein the guide body has a stepped portion extending in a direction intersecting with a direction of a flow of intake air.

A second aspect of the present disclosure is an intake apparatus of an engine provided with a fuel supplying device for supplying fuel into an intake passage, the intake apparatus including: a guide body having multiple holes disposed in the intake passage located downstream from the fuel supplying device, wherein the guide body has a curved cross-section, and separated passages separated by the guide body are formed in the intake passage.

A third aspect of the present disclosure is an intake apparatus of an engine provided with a fuel supplying device for supplying fuel into an intake passage, the intake apparatus including: a guide body having multiple holes disposed in the intake passage located downstream from the fuel supplying device, wherein the guide body has a stepped portion extending in a direction intersecting with a direction of a flow of intake air and has a curved cross-section, and separated passages, separated by the guide body, are formed in the intake passage.

A fourth aspect of the present disclosure is the intake apparatus of an engine according to any one of first to third aspects, wherein a plurality of the stepped portions are arranged in parallel.

A fifth aspect of the present disclosure is the intake apparatus of an engine according to any one of the first to fourth aspects, wherein the holes are formed at parts displaced from the stepped portion.

A sixth aspect of the present disclosure is the intake apparatus of an engine according to any one of the first to fifth aspects, wherein the multiple holes located upstream of the flow of the intake air are different from the multiple holes located downstream the flow of the intake air in size.

A seventh aspect of the present disclosure is the intake apparatus of an engine according to any one of the first to sixth aspects, wherein the holes located on upstream of the flow of the intake air are larger and the holes located on downstream of the flow the intake are smaller.

An eighth aspect of the intake apparatus of an engine according to any one of first to seventh aspects, wherein each of the holes is a choking hole whose passage cross-sectional area is narrowed on one side.

A ninth aspect of the present disclosure is the intake apparatus of an engine according to the eighth aspect, wherein the choking hole includes a large-diameter passage portion and a small-diameter passage portion.

A tenth aspect of the present disclosure is the intake apparatus of an engine according to the eighth aspect, wherein the choking hole is gradually narrowed from a large-diameter passage to a small-diameter passage.

An eleventh aspect of the present disclosure is the intake apparatus of an engine according to the ninth or tenth aspect, wherein the choking holes are arranged so that narrowed sides of the respective choking holes are alternately located on opposite sides of the guide body.

A twelfth aspect of the present disclosure is the intake apparatus of an engine according to any one of the first to seventh aspects, wherein the holes are through holes where passage cross-sectional areas of the respective holes are equal to one another.

A twelfth aspect of the present disclosure is the intake apparatus of an engine provided with a fuel supply device for supplying fuel into an intake passage, which includes a guide body disposed in the intake passage located downstream from the fuel supply device, wherein a volume ratio of the guide body relative to the intake passage is ranged between 3 volume percent and 15 volume percent.

A thirteenth aspect of the present disclosure is an intake apparatus of an engine provided with a fuel supply device for supplying fuel into an intake passage, which includes a guide body disposed in the intake passage located downstream from the fuel supply device, wherein a volume ratio of the guide body relative to the intake passage is ranged between 3 volume percent and 15 volume percent, and the guide body has at least one hole therein.

A fourteenth aspect of the present disclosure is an intake apparatus of an engine provided with a fuel supply device for supplying fuel into an intake passage, which includes a guide body disposed in the intake passage located downstream from the fuel supply device, wherein a volume ratio of the guide body relative to the intake passage is ranged between 3 volume percent and 15 volume percent, and the guide body has at least one hole therein where the volume ratio of the total holes in the intake passage relative to the guide body is ranged between 20 volume percent and 48 volume percent.

A fifteenth aspect of the present disclosure is the intake apparatus of an engine as above, and the intake apparatus has multiple guide bodies.

A sixteenth aspect of the present disclosure is the intake apparatus of an engine as above, and the holes are extending in a longitudinal direction and a horizontal direction.

A seventeenth aspect of the present disclosure is the intake apparatus of an engine according to any one of the first to fifth aspects, wherein the guide body having the multiple holes is disposed in the intake passage of a 2-stroke engine.

A eighteenth aspect of the present disclosure is the intake apparatus of an engine according to any one of first to sixth aspects, wherein the guide body having the multiple holes is disposed in the intake passage of a 4-stroke engine.

The present disclosure has the following effects by the above configurations.

According to the first aspect of the present disclosure, the guide body having the multiple holes is disposed in the intake passage located downstream from the fuel supplying device and has the stepped portion extending in the direction intersecting with the direction of the flow of the intake air. Consequently, fuel supplied from the fuel supplying device is mixed with air, and the intake air changes in flow rate and is atomized through further generation of turbulence due to the stepped portion of the guide body having the multiple holes. Since the air-fuel mixture atomized in the two stages is supplied, combustion efficiency and fuel consumption are improved. Also, since fuel components in the atomized air-fuel mixture remain in the plural holes as droplets, and the residual air-fuel mixture is supplied in the subsequent intake stroke, the combustion efficiency is further improved, and harmful components in exhaust gas can be reduced.

According to the second aspect of the present disclosure, the guide body having the multiple holes is disposed in the intake passage located downstream from the fuel supplying device and has the curved cross-section, and the separated passages separated by the guide body are formed in the intake passage. Consequently, fuel supplied from the fuel supplying device is mixed with air and the intake air changes flow rate in the separated passages separated by the curve of the guide body having the curved cross-section and is atomized through further generation of turbulence due to the guide body having the multiple holes. Since the air-fuel mixture atomized in the two stages is supplied, combustion efficiency and fuel consumption are improved. Also, since fuel components in the atomized air-fuel mixture remain in the plural holes as droplets, and the residual air-fuel mixture is supplied in the subsequent intake stroke, the combustion efficiency is further improved, and harmful components in exhaust gas can be reduced.

According to the third aspect the present disclosure, the guide body having the multiple holes disposed in the intake passage located downstream from the fuel supplying device, has the stepped portion extending in the direction intersecting with the direction of the flow of the intake air, and has the curved cross-section, and the separated passages separated by the guide body are formed in the intake passage. Consequently, fuel supplied from the fuel supplying device is mixed with air, the intake air changes in flow rate due to the stepped portion of the guide body having the multiple holes, and the intake air changes in flow rate in the separated passages separated by the curve of the guide body having the curved cross-section and is atomized through further generation of turbulence. Since the air-fuel mixture atomized in the two stages is supplied, combustion efficiency and fuel consumption are improved. Also, since fuel components in the atomized air-fuel mixture remain in the plural holes as droplets, and the residual air-fuel mixture is supplied in the subsequent intake stroke, the combustion efficiency is further improved, and harmful components in exhaust gas can be reduced.

According to the fourth aspect of the present disclosure, the intake air hits against the plural parallel stepped portions and is atomized through further generation of turbulence, and combustion efficiency and fuel consumption are improved.

According to the fifth aspect of the present disclosure, by forming the holes at the parts displaced from the stepped portion, the intake air hits against the stepped portion and is atomized through further generation of turbulence by the holes, and combustion efficiency and fuel consumption are improved.

According to the sixth aspect of the present disclosure, the multiple holes have different sizes on the upstream side and the downstream side in the direction of flow of the intake, and thus the intake air is atomized through further generation of turbulence. According to the seventh aspect of the present disclosure, the holes are larger on the upstream side in the direction of the flow of the intake air and smaller on the downstream side, and thus the intake air is atomized through further generation of turbulence on the upstream side while the blown-back air-fuel mixture can be stopped on the downstream side.

According to the eighth aspect of the present disclosure, each of the holes is the choking hole whose passage cross-sectional area is narrowed on one side. Consequently, the intake air changes in flow rate and is atomized through further generation of turbulence.

According to the ninth aspect of the present disclosure, the choking hole includes the large-diameter passage portion and the small-diameter passage portion. Consequently, the intake air changes in flow rate due to a change in passage diameter and is atomized through further generation of turbulence.

According to the tenth aspect of the present disclosure, the choking hole is gradually narrowed from the large-diameter passage to the small-diameter passage. Consequently, the intake air changes in flow rate due to the change in passage diameter and atomized through further generation of turbulence.

According to the eleventh aspect of the present disclosure, the choking holes are arranged to alternate the narrowed sides on both sides of the guide body, and thus the intake air is atomized through further generation of turbulence.

According to the twelfth aspect the present disclosure, each of the holes is the through hole having the equal passage cross-sectional area, and thus the intake air is higher in flow rate and is atomized through further generation turbulence.

According to the thirteenth aspect of the present disclosure, the guide body having the multiple holes is disposed in the intake passage of the 2-stroke engine. Consequently, combustion efficiency and fuel consumption are improved in the 2-stroke engine.

According to the fourteenth aspect of the present disclosure, the guide body having the multiple holes is disposed in the intake passage of the 4-stroke engine. Consequently, combustion efficiency and fuel consumption are improved in the 4-stroke engine.

According to the fifteenth aspect of the present disclosure, the guide body has holes that are in the direction of the length of the guide body and the guide body may have holes that are perpendicular to the holes that run the lengthwise direction of the guide body.

According to the sixteenth aspect of the present disclosure, the guide body may be cubic, conical, cylindrical, or any other configuration or shape that is more of a three dimensional orientation.

DESCRIPTION OF THE EMBODIMENTS

Embodiments of an intake apparatus of an engine according to the present disclosure will be described below with reference to the accompanying drawings, but the present disclosure is not limited to these embodiments.

[Configuration of Engine]
(2 Stroke Engine)

Figure 1:
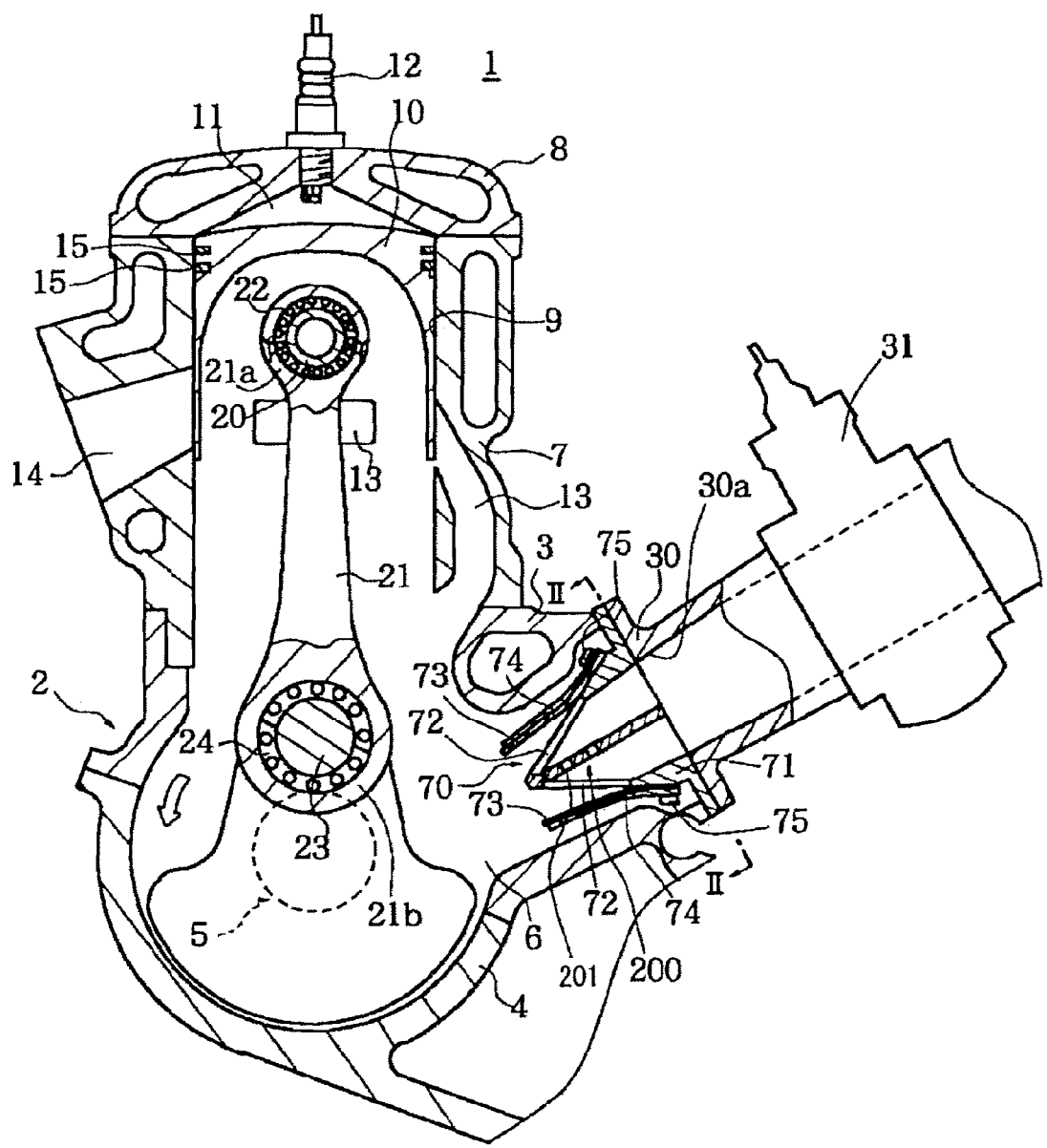
FIG. 1 is a vertical cross-sectional view depicting a 2-stroke engine provided with an intake apparatus.
Figure 2:
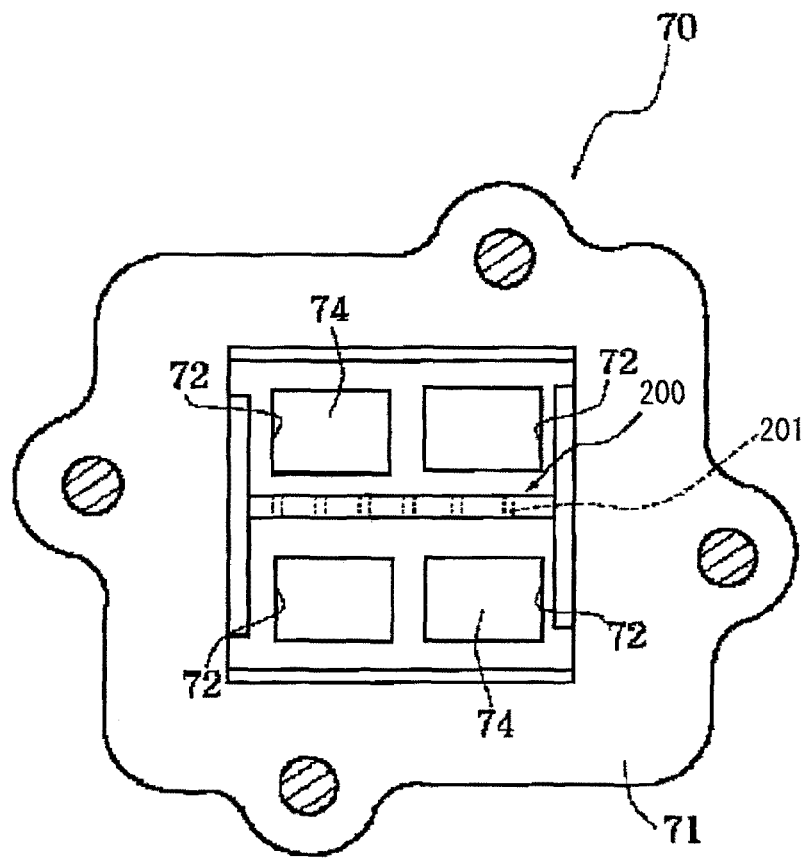
FIG. 2 is a cross-sectional view taken along the line II-II in FIG. 1.

FIGS. 1 and 2 illustrates an embodiment made by applying the present disclosure to a 2-stroke engine, where FIG. 1 is a vertical cross-sectional view of the 2-stroke engine provided with an intake apparatus and FIG. 2 is a cross-sectional view taken along the line II-II in FIG. 1.

According to the present disclosure, in the intake apparatus of the engine provided with a fuel supplying device for supplying fuel into an intake passage, a guide body 200 having multiple holes 201 is disposed in the intake passage located downstream from the fuel supplying device.

The engine of the present embodiment is a 2-stroke engine 1, and the 2-stroke engine 1 includes a crank case 2 having an upper case 3 and a lower case 4. A crank shaft 5 is pivotally supported between the upper case 3 and the lower case 4, and a crank chamber 6 is constructed of the upper case 3 and the lower case 4.

A cylinder block 7 is attached to the upper case 3, and a cylinder head 8 is attached to the cylinder block 7. A piston 10 is reciprocally disposed in a cylinder 9 formed in the cylinder block 7. A combustion chamber 11 is a space defined by the cylinder 9, the head of the piston 10, and the cylinder head 8. A spark plug 12 is attached to the cylinder head 8, while facing the combustion chamber 11. In the cylinder block 7 there are three scavenging passages 13 and an exhaust passage 14. The scavenging passages 13 make the crank chamber 6 communicate with the combustion chamber 11 in the scavenging stroke, and the exhaust passage 14 discharges exhaust gas in the combustion chamber 11 in the exhaust stroke. Two of the three scavenging passages 13 are oppositely arranged to each other in a radial direction of the cylinder 9 while the other scavenging passage 13 is oppositely arranged opposite to the exhaust passage 14 between the two opposed scavenging passages 13.

Two piston rings 15 are disposed on the upper portion of the piston 10. A small end 21a of a connecting rod 21 is rotatably supported by a piston pin 20 through a bearing 22, where the piston pin 20 is provided at the piston 10. In addition, a large end 21b of the connecting rod 21 is supported by a crank pin 23 of the crank shaft 5 through a bearing 24. By the connecting rod 21, the reciprocating motion of the piston 10 is converted into a rotating motion and is transmitted to the crank shaft 5.

An intake pipe 30 is connected to the upper case 3 of the crank case 2 through a reed valve 70. Furthermore, a carburetor 31 is connected to the intake pipe 30 and serves as a fuel supplying device. In the reed valve 70, an intake port 72 is formed in a body 71, and a valve 73 and a valve stopper 74 that open and close the intake port 72 are fastened together with a screw 75. The valve 73 of the reed valve 70 opens during the intake stroke, in which the crank chamber 6 is under negative pressure, to intake an air-fuel mixture from an intake passage 30a of the intake pipe 30. In this manner, the reed valve 70 allows only a flow of intake air from the intake pipe 30 to the crank chamber 6. The crank chamber 6 serves as a primary compression chamber for the intake air.

In the reed valve 70 arranged at the intake passage 30a located downstream from the carburetor 31 as a fuel supplying device, the guide body 200 having the multiple holes 201 is disposed. The guide body 200 is in a plate shape and made of a metal, such as aluminum, stainless steel, or copper; a carbon material; a wood; or a bamboo.

As a result of disposing the guide body 200 having the multiple holes 201 in the intake passage of the 2stroke engine 1, fuel supplied from the fuel supplying device is mixed with air in the 2-stroke engine 1, and the intake changes in flow rate and is atomized through further generation of turbulence due to the guide body 200 having the multiple holes 201. Since air-fuel mixture atomized in the two stages is supplied, combustion efficiency and fuel consumption are improved. Also, since fuel components in the atomized air-fuel mixture remain in the plural holes as droplets, and the residual air-fuel mixture is supplied in the subsequent intake stroke, the combustion efficiency is further improved, and harmful components in exhaust gas can be reduced.

(4-Stroke Engine)

Figure 3:
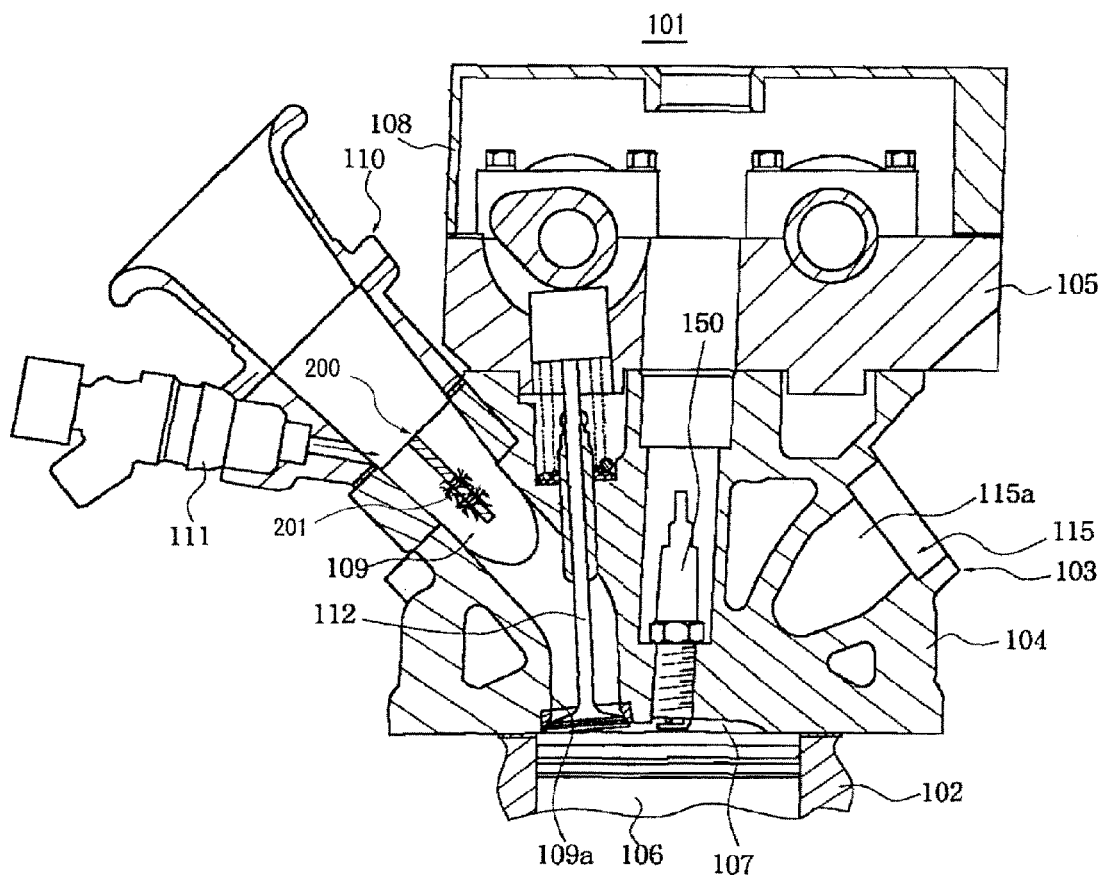
FIG. 3 is a vertical cross-sectional view depicting a 4-stroke engine provided with an intake apparatus.

Next, an embodiment made by applying the present disclosure to a 4-stroke engine will be described. FIG. 3 is a vertical cross-sectional view of the 4-stroke engine provided with an intake apparatus.

In the present embodiment, a cylinder head 103 is attached to a cylinder block 102 of a 4-stroke engine 101 having multiple cylinders and is constituted by a head lower portion 104 and a head upper portion 105. A combustion chamber 107 is a space defined by the head lower portion 104 and a piston 106 fitted in the cylinder block 102, and a head cover 108 is attached to the head upper portion 105. An intake passage 109 is formed in the head lower portion 104 and is opened to the combustion chamber 107 by three branching passages 109a.

The branching passages 109a of the intake passage 109 are provided with intake valve 112, respectively. Thus, the intake valve 112 is opened and closed to supply an air-fuel mixture to the combustion chamber 107. Also, an exhaust passage 115 is formed in the head lower portion 104, in which a pair of branching passages 115a is opened to the combustion chamber 107. The branching passages 115a are provided with exhaust valves (not shown), respectively. Thus, the exhaust value is opened and closed to discharge exhaust from an exhaust pipe (not shown) connected to the exhaust passage 115.

An intake pipe 110 is connected to the intake passage 109 and is provided with an injector 111 as a fuel supplying device. The injector 11 injects fuel at predetermined timing. Also, a spark plug 150 is attached to the head lower portion 104 while facing the combustion chamber 107.

In the intake passage 109 located downstream from the injector 111 provided as a fuel supplying device, the guide body 200 having the multiple holes 201 is disposed along a direction of a flow of intake air.

Fuel supplied from the injector 111 is mixed with air, and the intake air is atomized through further generation of turbulence due to the guide body 200 having the multiple holes 201. Since the air-fuel mixture atomized in the two stages is supplied, combustion efficiency is improved. As a result, a further improvement in fuel consumption is attained. Also, the combustion efficiency is further improved because fuel components in the atomized air-fuel mixture remain in the plural holes 201 of the guide body 200 as droplets and the residual air-fuel mixture is supplied in the subsequent intake stroke.

Also, regardless of an attaching direction of the intake passage 109, an atomizing rate of the air-fuel mixture can be further improved without decreasing the flow rate of the flow of the intake air, the combustion efficiency and the fuel consumption can be improved, and harmful components in exhaust gas, such as carbon monoxide (CO), hydrocarbon (HC), and nitrogen oxide (NOx), can be reduced.

[Configuration of Guide Body]
(General Structure)

In all configurations of the guide body in the present invention, the intake apparatus of the engine is provided with the fuel supply device for fuel into the intake passage. The guide body is disposed in the intake passage located downstream from the fuel supply device. The volume ratio of the guide body relative to the intake passage is ranged between 3 volume percent and 15 volume percent. The guide body may have one or more holes but the volume ratio of the total holes in the intake passage relative to the guide body is ranged between 20 volume percent and 48 volume percent.

(First Embodiment)

Configurations of the guide body in a first embodiment are illustrated in FIGS. 4 to 9.

Figure 4:
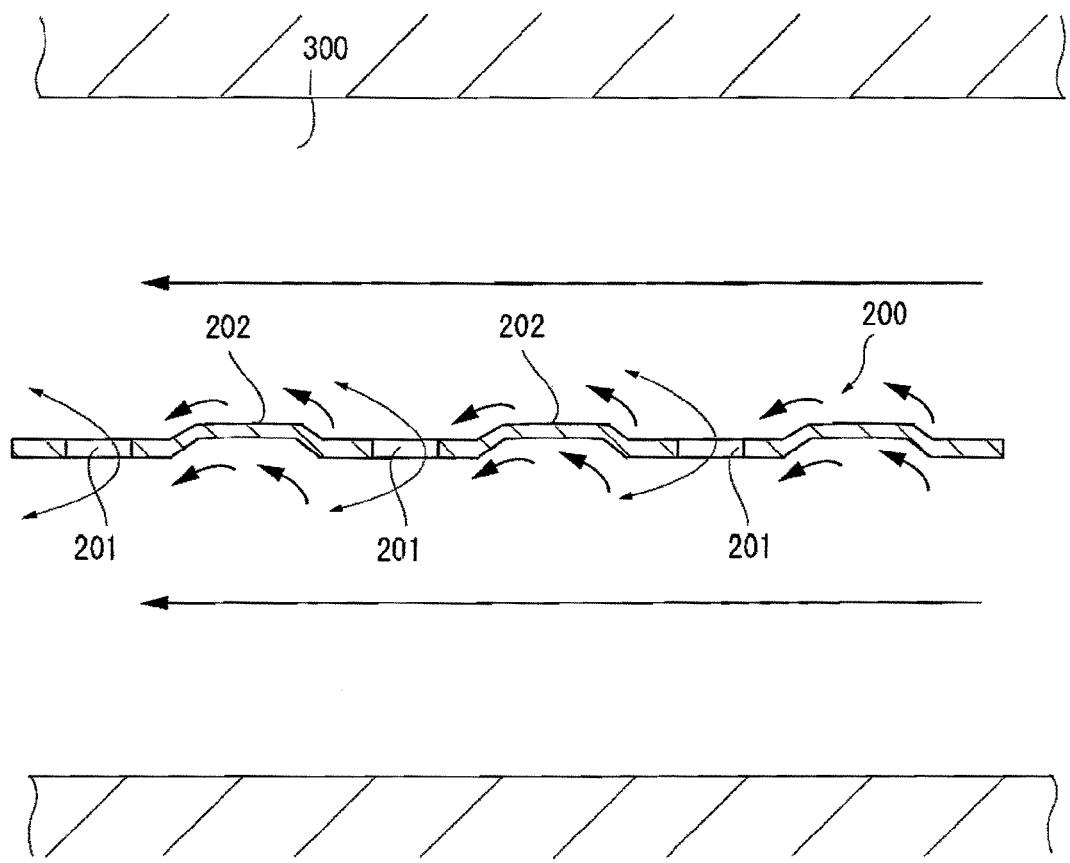
FIG. 4 is a cross-sectional view depicting an intake passage in a state of having a guide body of a first embodiment arranged therein.
Figure 5:
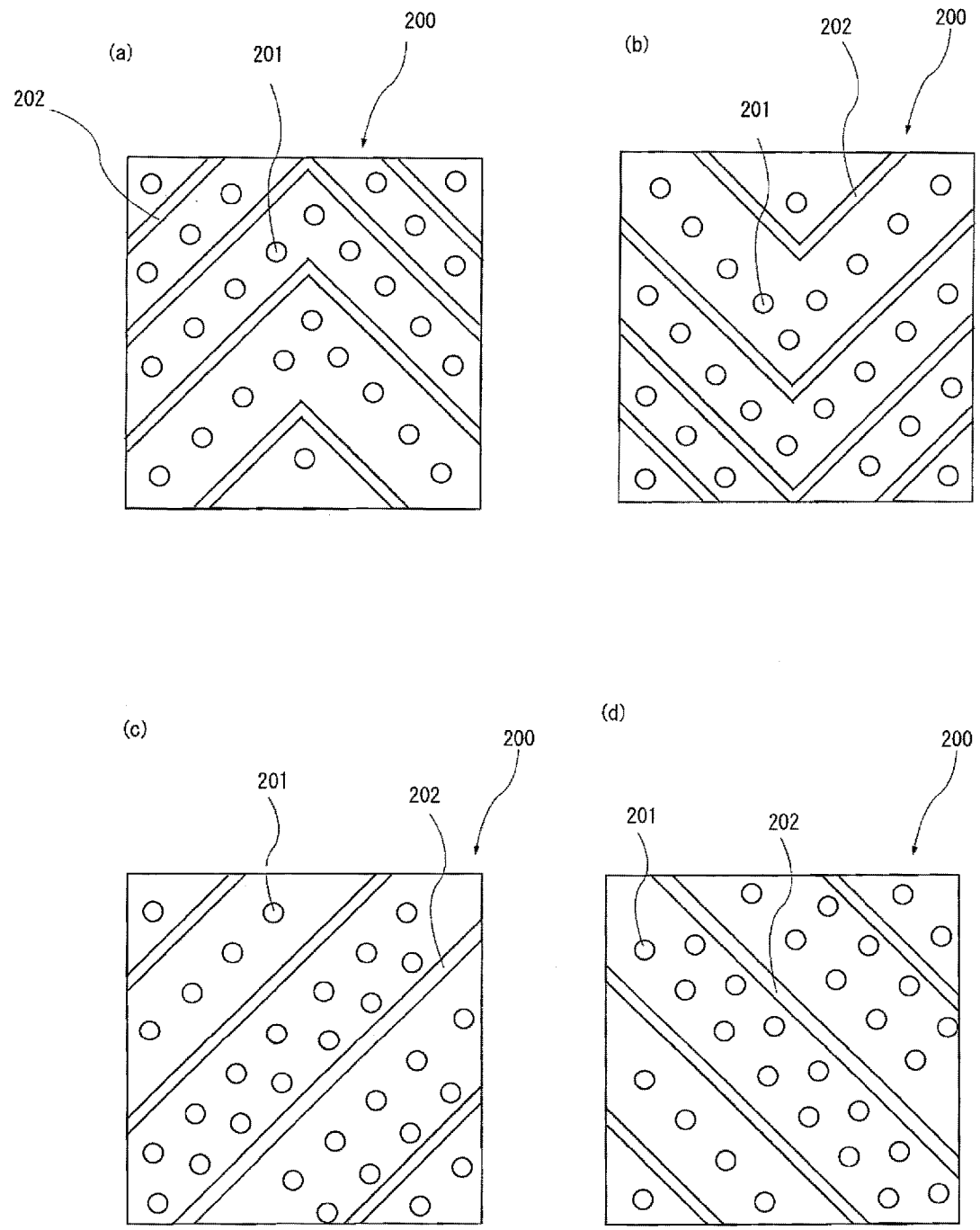
FIGS. 5A to 5D are plan views each depicting the guide body.
Figure 6:
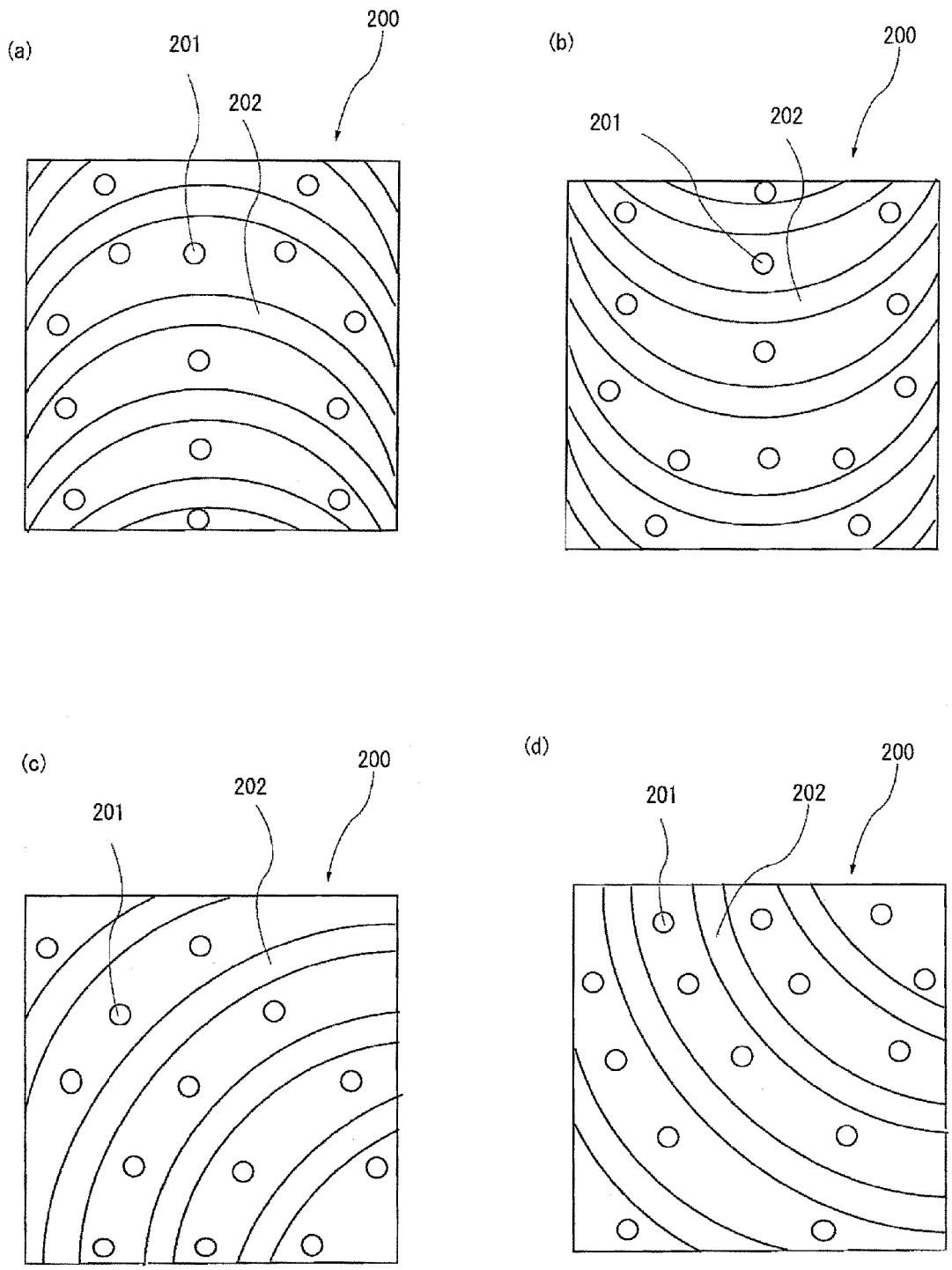
FIGS. 6A to 6D are plan views each depicting the guide body.
Figure 7:
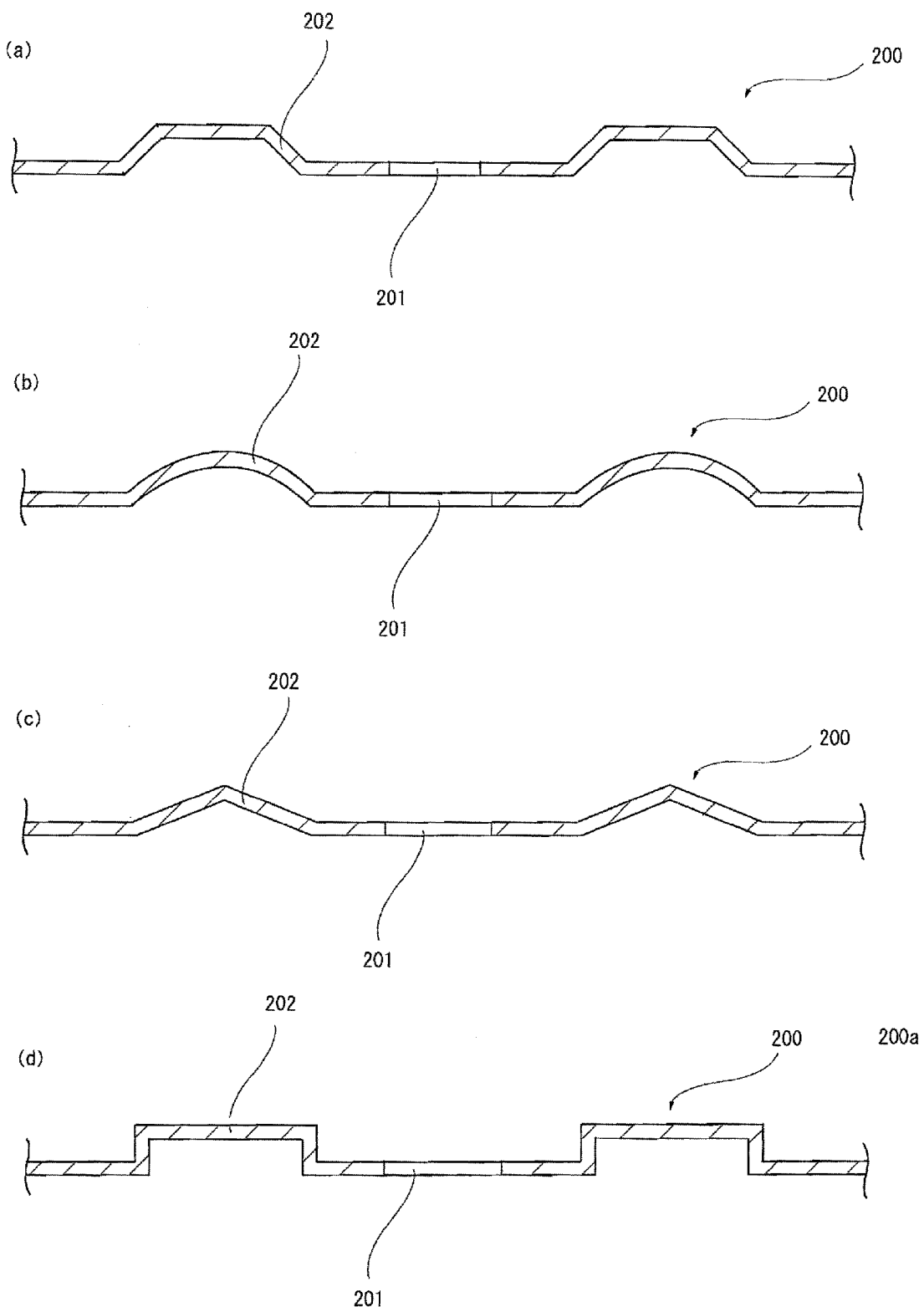
FIGS. 7A to 7D are cross-sectional views each depicting the guide body.
Figure 8:
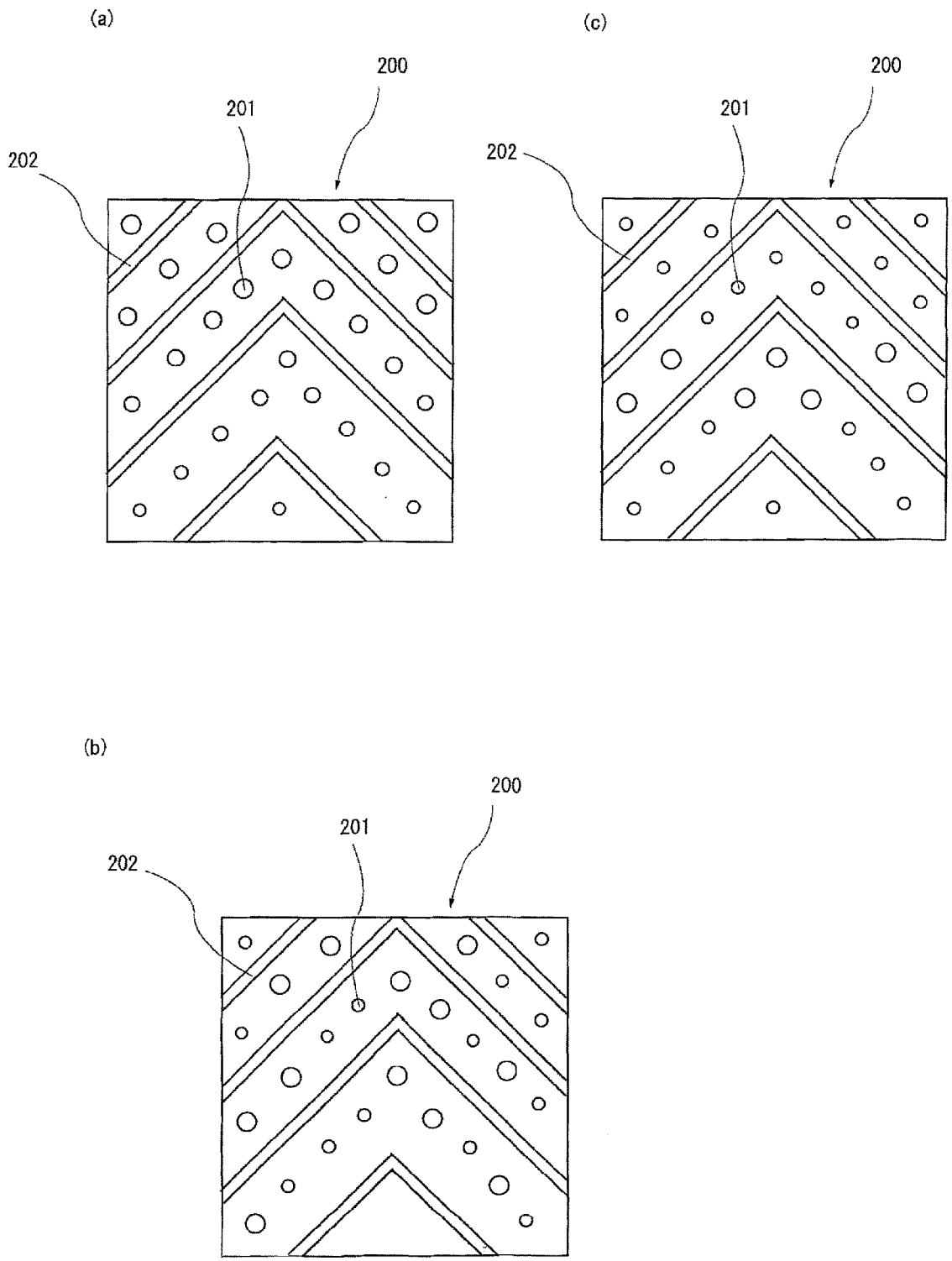
FIGS. 8A to 8C are plan views each depicting the guide body.
Figure 9:
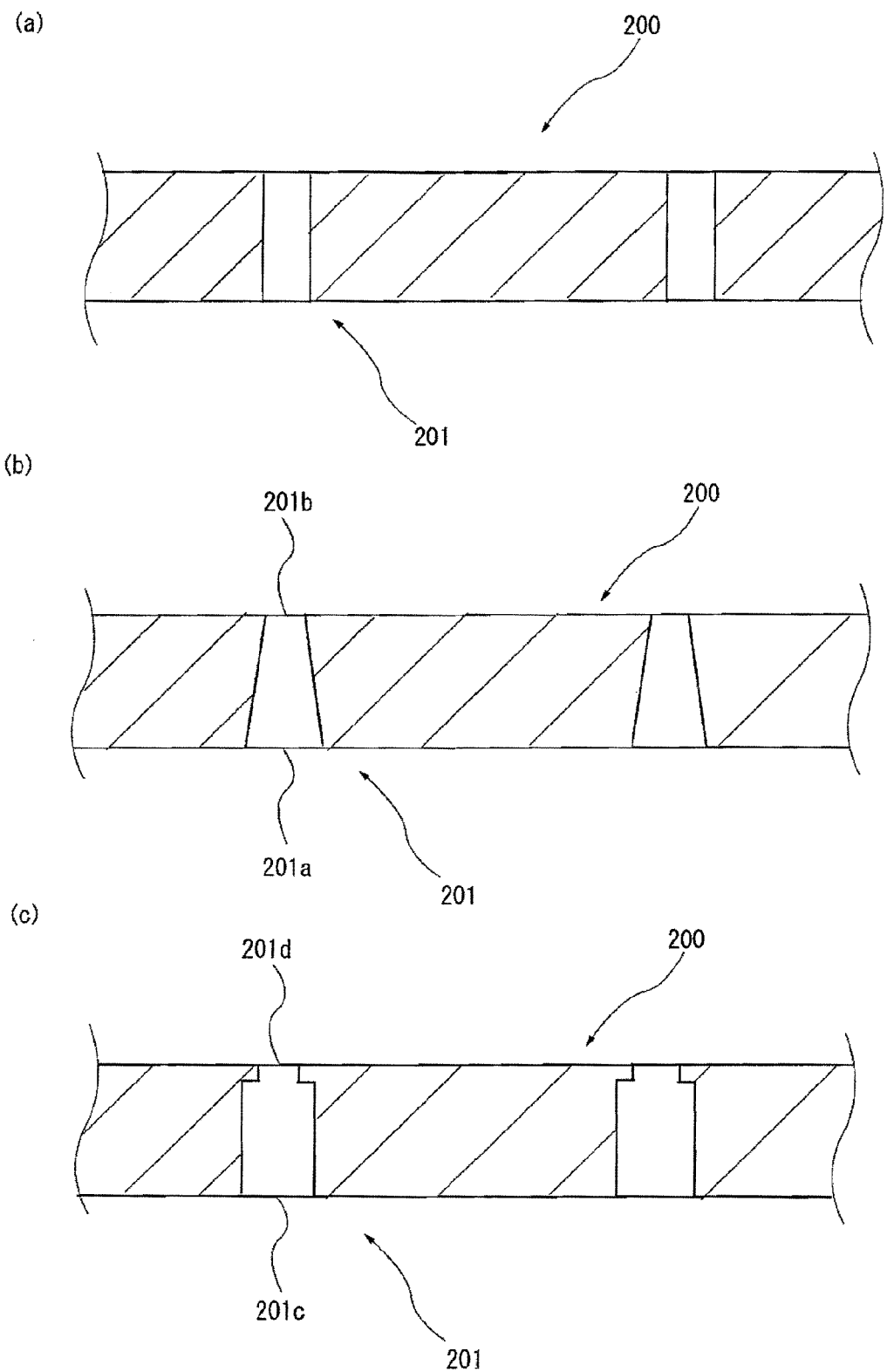
FIGS. 9A to 9C are cross-sectional views each depicting the hole part of the guide body.

FIG. 4 is a cross-sectional view depicting an intake passage in a state of having the guide body arranged therein, FIGS. 5A to 5D and 6A to 6D are plan views each depicting the guide body, FIGS. 7A to 7D are cross-sectional views depicting the guide body, FIGS. 8A to 8C are plan views each depicting the guide body, and FIGS. 9A to 9C are cross-sectional views depicting the hole of the guide body. In the first embodiment, the guide body 200 having the multiple holes 201 is disposed in an intake passage 300 located downstream from a fuel supplying device and has stepped portions 202 each extending in a direction intersecting with a direction of a flow intake air, and a plurality of stepped portions 202 are arranged in parallel. The multiple holes 201 are formed by a punching process, a cutting process, or the like, and the stepped portions 202 are formed by a bending process, a cutting process, or the like. Also, the holes 201 are formed at parts displaced from the stepped portions 202.

In the first embodiment, the guide body 200 having the multiple holes 201 is disposed in the passage 300 located downstream from the fuel supplying device, is in a plate shape, and has the stepped portions 202 extending in the direction intersecting with the direction of the flow of the intake air. Consequently, fuel supplied from the fuel supplying device is mixed with air due to the multiple holes 201, and the intake air changes in flow rate as the intake air hits against the stepped portions 202 and is atomized through further generation of turbulence. Since an air-fuel mixture atomized in two stages is supplied, combustion efficiency and fuel consumption are improved.

In embodiments in FIGS. 5A to 5D, although the stepped portions 202 extend approximately at angle of 45 degrees with respect to the direction intersecting with the direction of the flow of the intake air, angle is not limited to this but may be any angle as long as it is an angle not perpendicular to the direction, and intake a can change in flow rate as the intake air hits the stepped portions 202. In FIG. 5A, two stepped portions 202 intersect with each other at an angle of approximately 45 degrees and are configured so the intersection may be located upstream of the flow of the intake air, in FIG. 5B, two stepped portions 202 are configured so that the intersection may be located downstream of the flow of the intake air, and in FIGS. 5C and 5D, one stepped portion 202 is configured to extend at an angle of approximately 45 degrees. Also, by arranging plural stepped portions 202 in parallel, the intake air hits against the plural parallel stepped portions 202 and is atomized through further generation of turbulence, and the combustion efficiency and the fuel consumption are improved.

In embodiments in FIGS. 6A to 6D, the stepped portions 202 are in circular arcs and extend at a predetermined angle with respect to the direction intersecting with the direction of the flow of the intake air. In FIG. 6A, the stepped portion 202 is configured so that the projecting side of the circular arc stepped portion 202 may be located at the center of the upstream side in the direction of the flow of the intake air, in FIG. 6B, the stepped portion 202 is configured so that the projecting side of the circular arc stepped portion 202 may be located at the center of the downstream side in the direction of the flow of the intake air, in FIG. 6C, the stepped portion 202 is configured so that the projecting side of the circular arc stepped portion 202 may be obliquely located upstream of the flow of the intake air, and in FIG. 6D, the stepped portion 202 is configured so that the projecting side of the circular arc stepped portion 202 may be obliquely located downstream of the flow of the intake air.

In the first embodiment, the stepped portion 202 is formed by a bending process by pressure molding. In FIG. 7A, the stepped portion 202 has a cross-section of a trapezoidal shape. In FIG. 7B, the stepped portion 202 has a cross-section of a curved shape. In FIG. 7C, the stepped portion 202 has a cross-section of a triangular shape. In FIG. 7D, the stepped portion 202 has a cross-section of a U shape. The cross-sectional shape of the stepped portion 202 is not limited to any of those in the present embodiment.

Next, configurations of the hole the guide body in the first embodiment are illustrated in FIGS. 8A to 8C and 9A to 9C. FIGS. 8A to 8C are plan views each depicting the guide body, and FIGS. 9A to 9C are cross-sectional views each depicting the guide body. The multiple holes 201 of the guide body 200 located upstream of flow of the intake air are different from those located downstream thereof in size. Thus, the holes 201 with different sizes cause the intake air to be atomized through further generation of turbulence. Also, the multiple holes 201 are formed at parts displaced from the stepped portions 202. Consequently, the intake air hits against the stepped portions 202 and is atomized by the holes 201 through further generation of turbulence, and the combustion and the fuel consumption are improved.

In FIG. 8A, the holes 201 located upstream of the flow of the intake air are configured to be larger and those located downstream thereof are configured to be smaller. In FIG. 8B, the holes 201 are configured to be gradually smaller from upstream to downstream of the flow of the intake air. In FIG. 8C, the holes 201 are configured to be smaller on the upstream side in the direction of the flow of the intake air larger at the center, and smaller on the downstream side of the flow.

In FIG. 9A, each of the holes 201 is a through hole having an equal passage cross-sectional area. In FIG. 9B, each of the holes 201 is a choking hole whose passage cross-sectional area is narrowed on one side and is gradually narrowed from a large-diameter passage 201a to a small-diameter passage 201b. In FIG. 9C, each of the holes 201 is a choking hole and includes a large-diameter passage portion 201c and a small-diameter passage portion 201d. In a case where the holes 201 are choking holes, they can be arranged to alternate the narrowed sides on both sides of the guide body 200 as depicted in FIGS. 9B and 9C. When each of the holes 201 is a choking hole whose passage cross-sectional area is narrowed on one side in this manner, the intake air further changes in flow rate by the choking holes and is atomized through further generation of turbulence.

Second Embodiment

Figure 10:
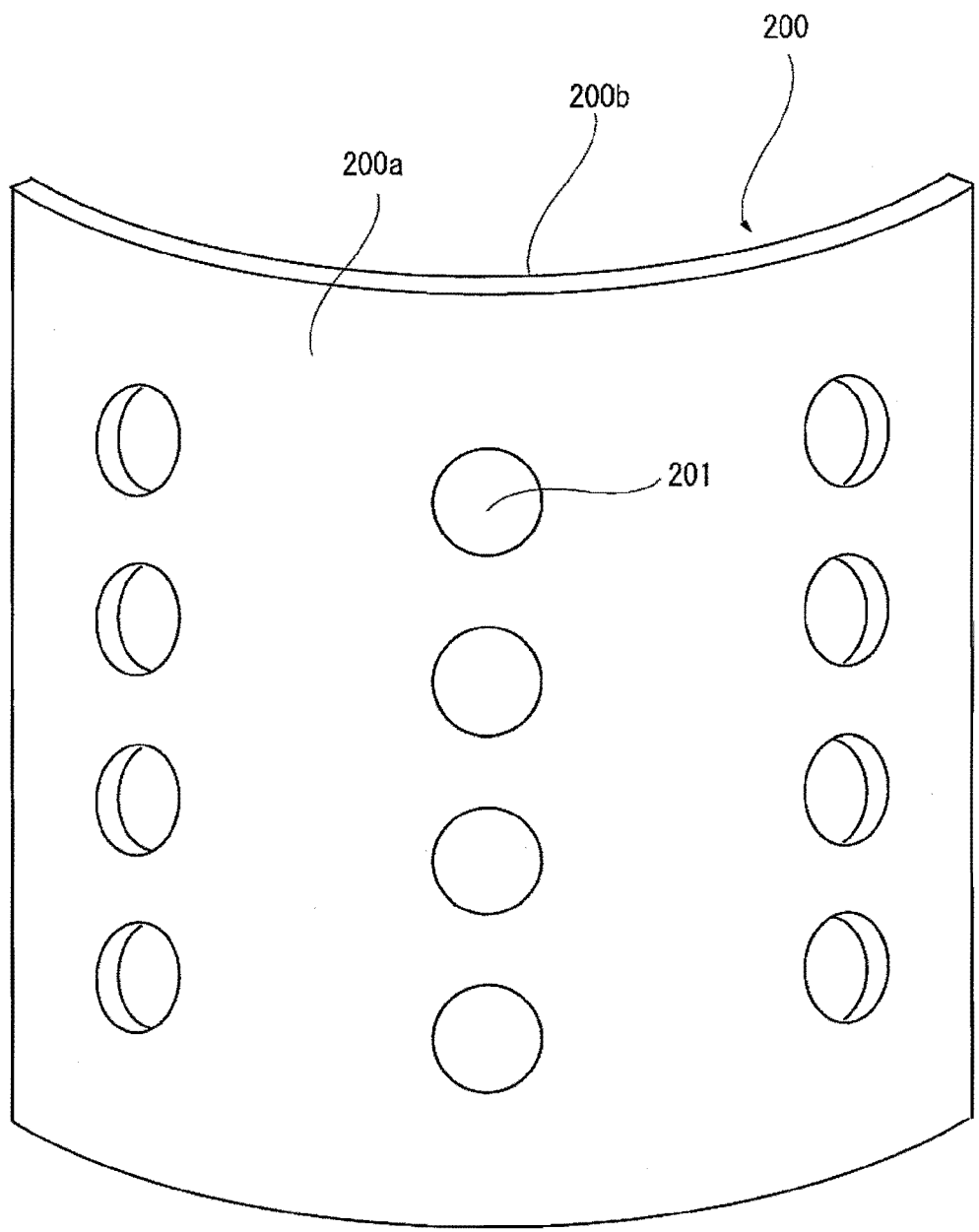
FIG. 10 is a perspective view depicting the guide body of a second embodiment.
Figure 11:
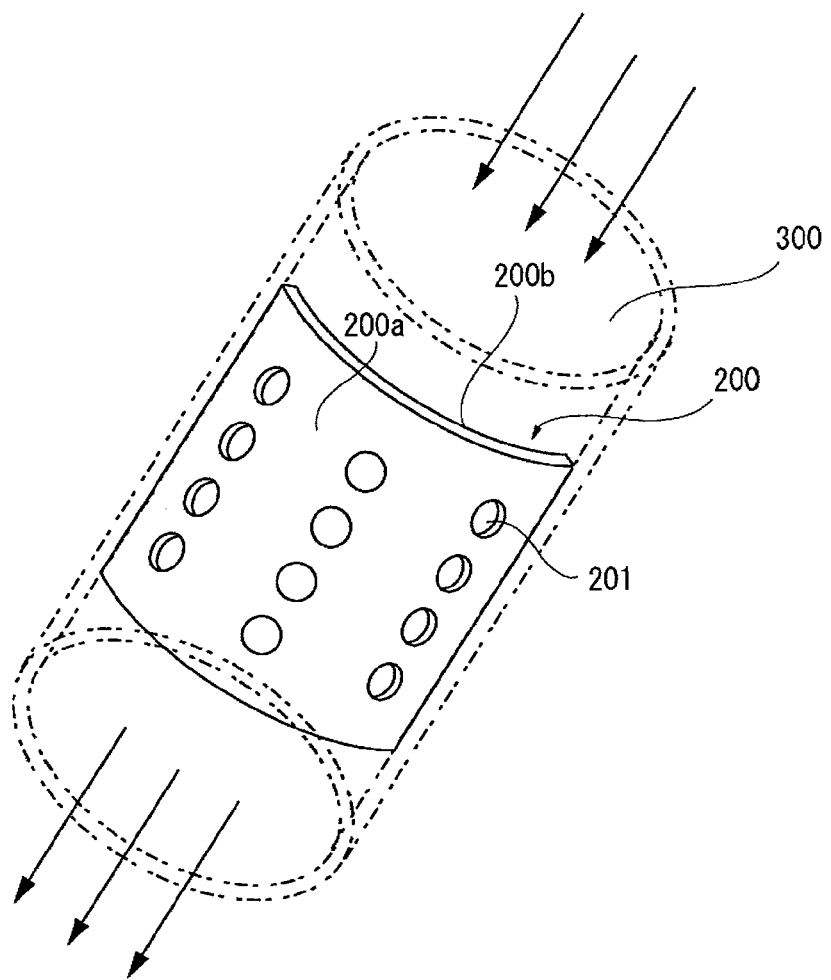
FIG. 11 is a schematic perspective view depicting a state of arranging the guide body in the intake passage.
Figure 12:
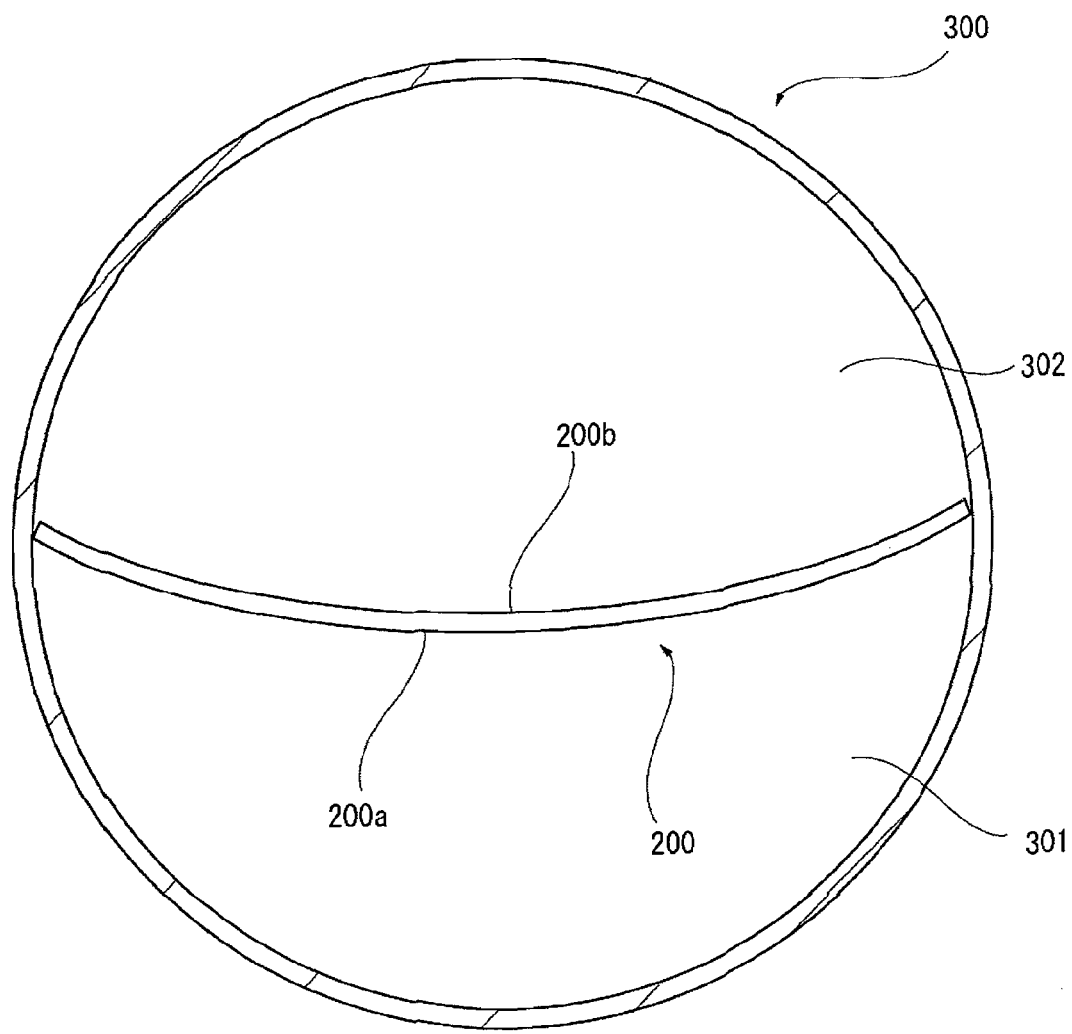
FIG. 12 is a cross-sectional view depicting the intake passage in which the guide body is arranged.

A configuration of the guide body in a second embodiment is shown in FIGS. 10 to 12. FIG. 10 is a perspective view of the guide body, FIG. 11 shows a state of arranging the guide body in the intake passage, and FIG. 12 is a cross-sectional view of the intake passage in which the guide body is arranged. In the second embodiment, the guide body 200 having the multiple holes 201 is disposed the in the intake passage located downstream from a fuel supplying device.

The guide body 200 has a curved cross-section and forms separated passages 301 and 302 separated by the guide body 200 in the intake passage 300. The guide body 200 has multiple holes 201, and the holes 201 are arranged to have equal sizes in a direction of a flow of intake air in FIG. 10 and are configured in a similar manner to that of the first embodiment.

In the second embodiment, the guide body 200 having the multiple holes 201 is disposed in the intake passage 300 located downstream from the fuel supplying device, has the curved cross-section, and forms the separated passages 301 and 302 separated by the guide body 200 in the intake passage 300. Consequently, fuel supplied from the fuel supplying device is mixed with air, and the intake air changes in flow rate in the separated passages 301 and 302 separated by the curve of the guide body 200 having the curved cross-section. That is, the flow rate in the separated passage 301 formed by the side of a projecting surface 200a of the curve of the guide body 200 is higher than the flow rate in the separated passage 302 formed by the side of a recessed surface 200b of the curve of the guide body 200. Also, the intake air is atomized through further generation of turbulence due to the multiple holes 201 of the guide body 200. Since an air-fuel mixture atomized in the two stages is supplied, combustion efficiency and fuel consumption are improved.

(Third Embodiment)

Figure 13:
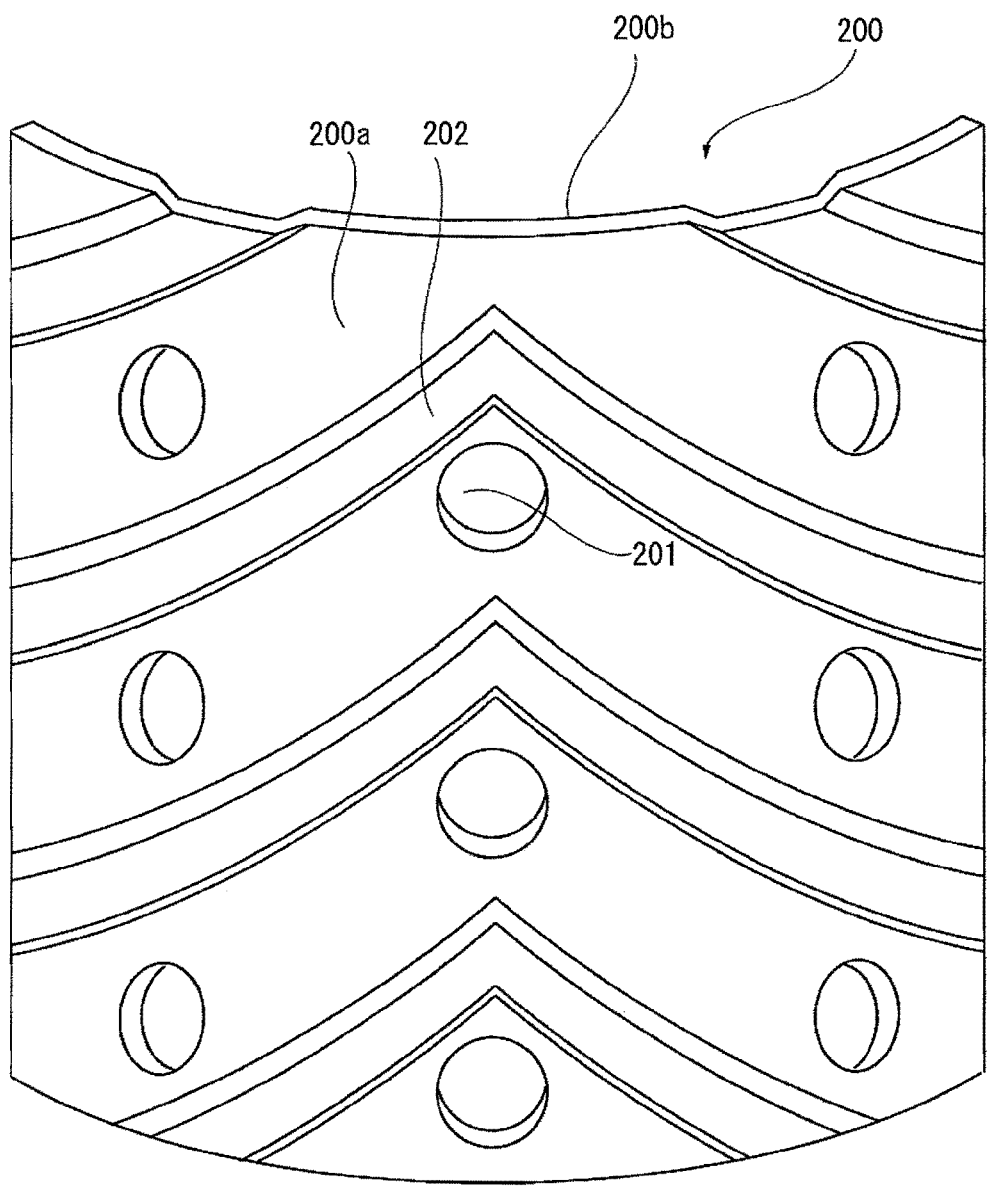
FIG. 13 is a perspective view depicting the guide body of a third embodiment.
Figure 14:
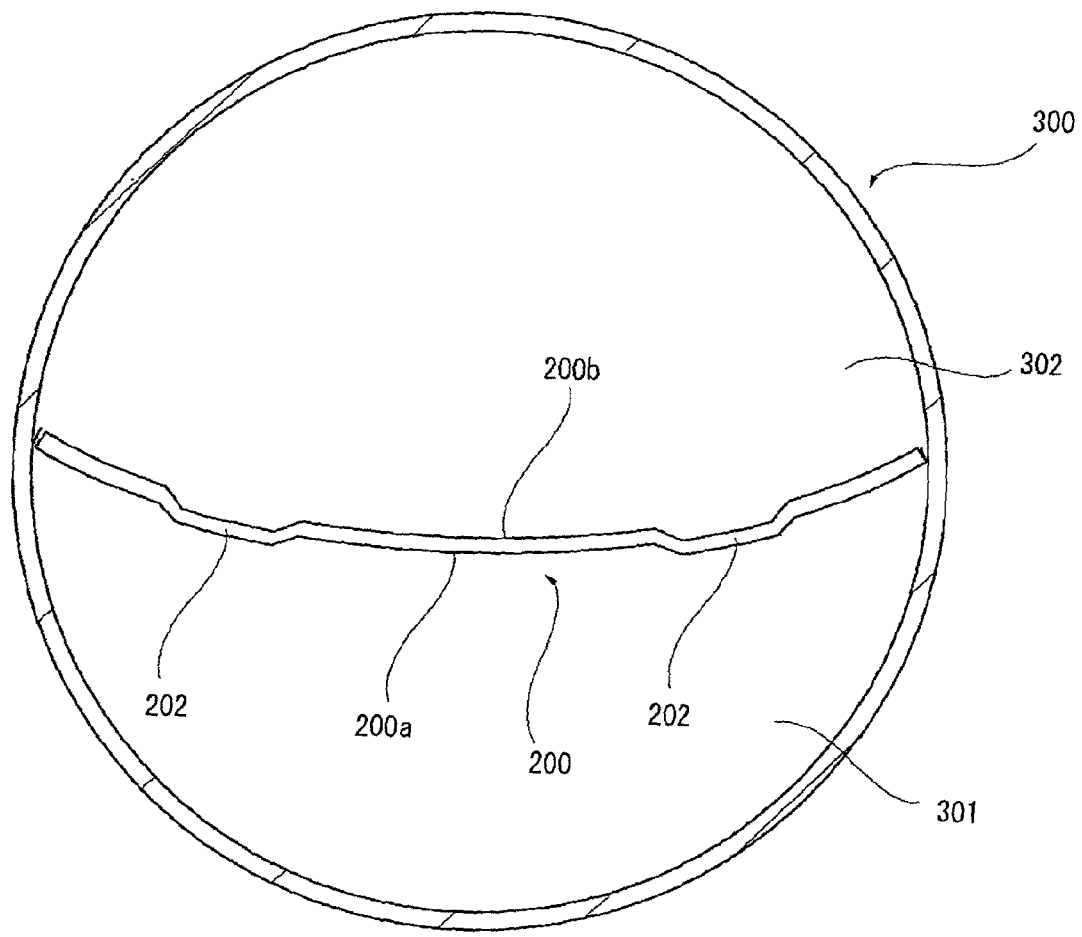
FIG. 14 is a cross-sectional view depicting the intake passage in which the guide body is arranged.

A configuration of the guide body in a third embodiment is illustrated in FIGS. 13 and 14. FIG. 13 is a perspective view of the guide body, and FIG. 14 is a cross-sectional view of the intake passage in which the guide body is arranged. In the third embodiment, the guide body 200 having the multiple holes 201 is disposed in the intake passage located downstream from a fuel supplying device.

The guide body 200 has a curved cross-section in a similar manner to that of the second embodiment and forms the separated passages 301 and 302 separated by the guide body 200 in the intake passage 300. The guide body 200 of the third embodiment has the stepped portions 202 each extending in a direction intersecting with a direction of a flow of intake air, and the stepped portions 202 are configured in a similar manner to that in the first embodiment.

In the third embodiment, the guide body 200 having the multiple holes 201 is disposed in the intake passage 300 located downstream from the fuel supplying device, has the stepped portions 202 each extending in the direction intersecting with the direction of the flow of the intake air, has the curved cross-section, and forms the separated passage 301 and 302 separated by the guide body 200 in the intake passage 300. Consequently, fuel supplied from the fuel supplying device is mixed with air, and the intake changes in flow rate due to the stepped portions 202 of the guide body 200 having the multiple holes 201.

The intake air further changes in flow rate in the separated passages 301 and 302 separated by the curve of the guide body 200 having the curved cross-section. That is, the flow rate in the separated passage 301 formed by the side of the projecting surface 200a of the curve of the guide body 200 is higher than the flow rate in the separated passage 302 formed by the side of the recessed surface 200b of the curve. Also, the intake air is atomized through further generation of turbulence due to the multiple holes 201 of the guide body 200. Since an air-fuel mixture atomized in the two stages is supplied, combustion efficiency and fuel consumption are improved.

(Fourth Embodiment)

Configurations of the guide body in a fourth embodiment are illustrated in FIGS. 15A to 15D. FIGS. 15A to 15D are cross-sectional views of the intake passages in which the guide bodies are arranged. In the fourth embodiment, the guide body 200 having the multiple holes 201 is disposed in the intake passage located downstream from a fuel supplying device. Although the guide body 200 of the present embodiment differs from those of the first to third embodiments in terms of a tubular shape, it is configured in a similar manner in other respects. Thus, description is omitted.

Figure 15:
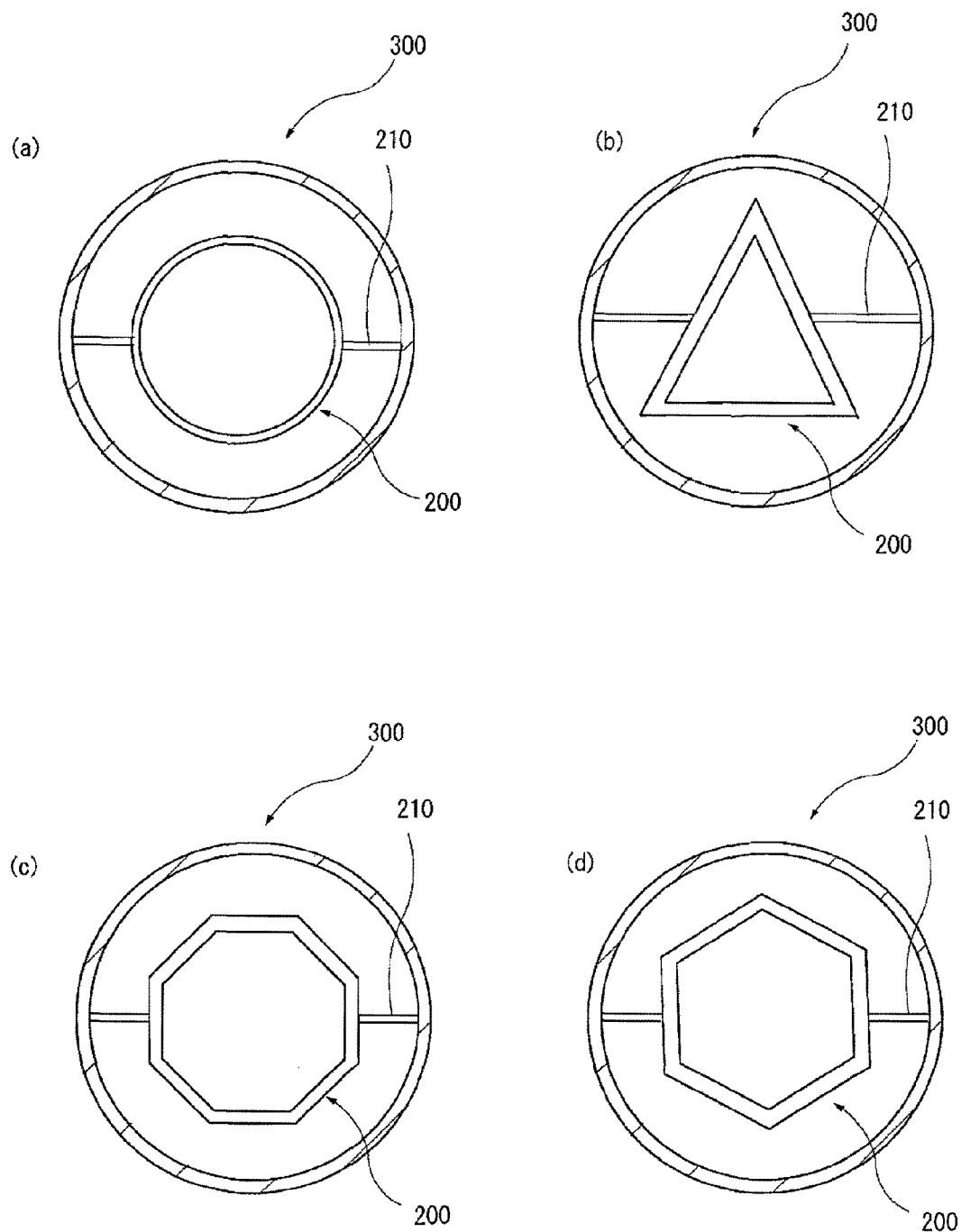
FIGS. 15A to 15D are cross-sectional views each depicting the intake passages in which the guide bodies of a fourth embodiment are arranged.
Figure 16:
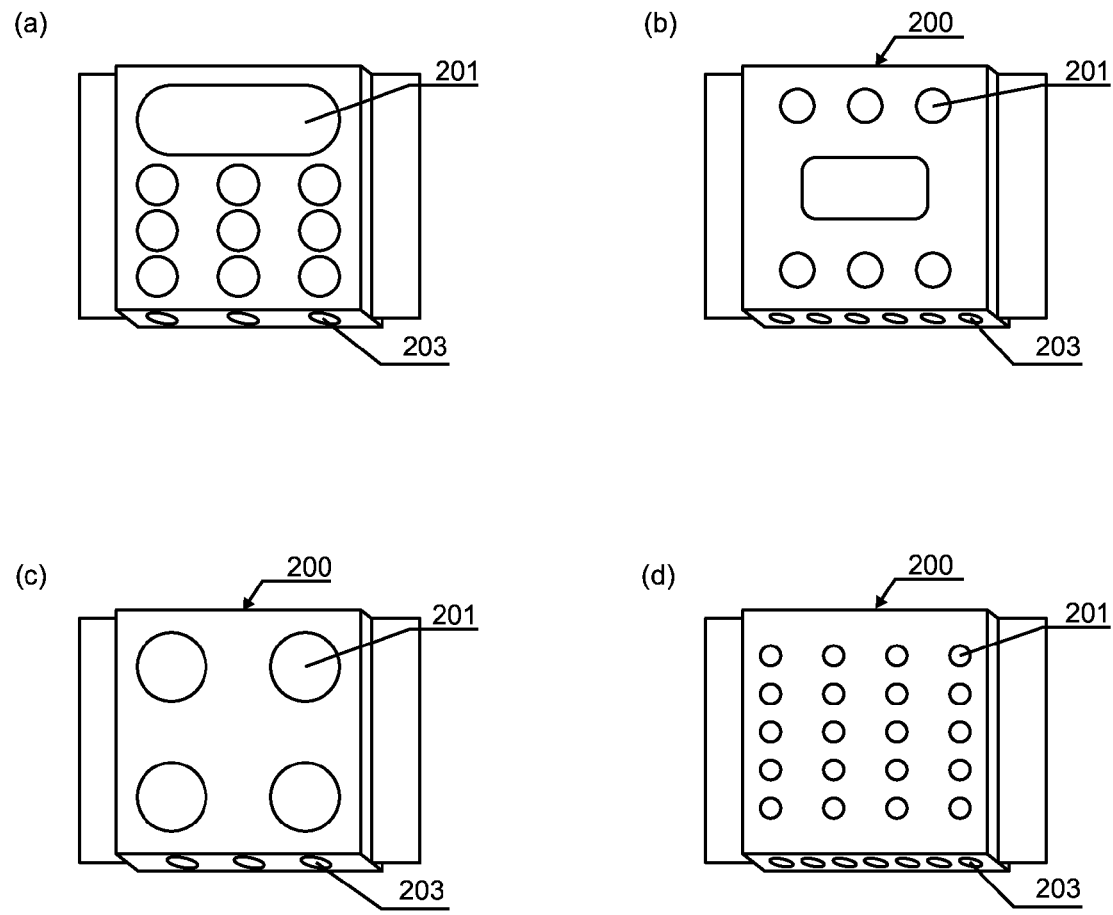
FIGS. 16A to 16D are cross-sectional views each depicting the guide body of fifth embodiments.
Figure 17:
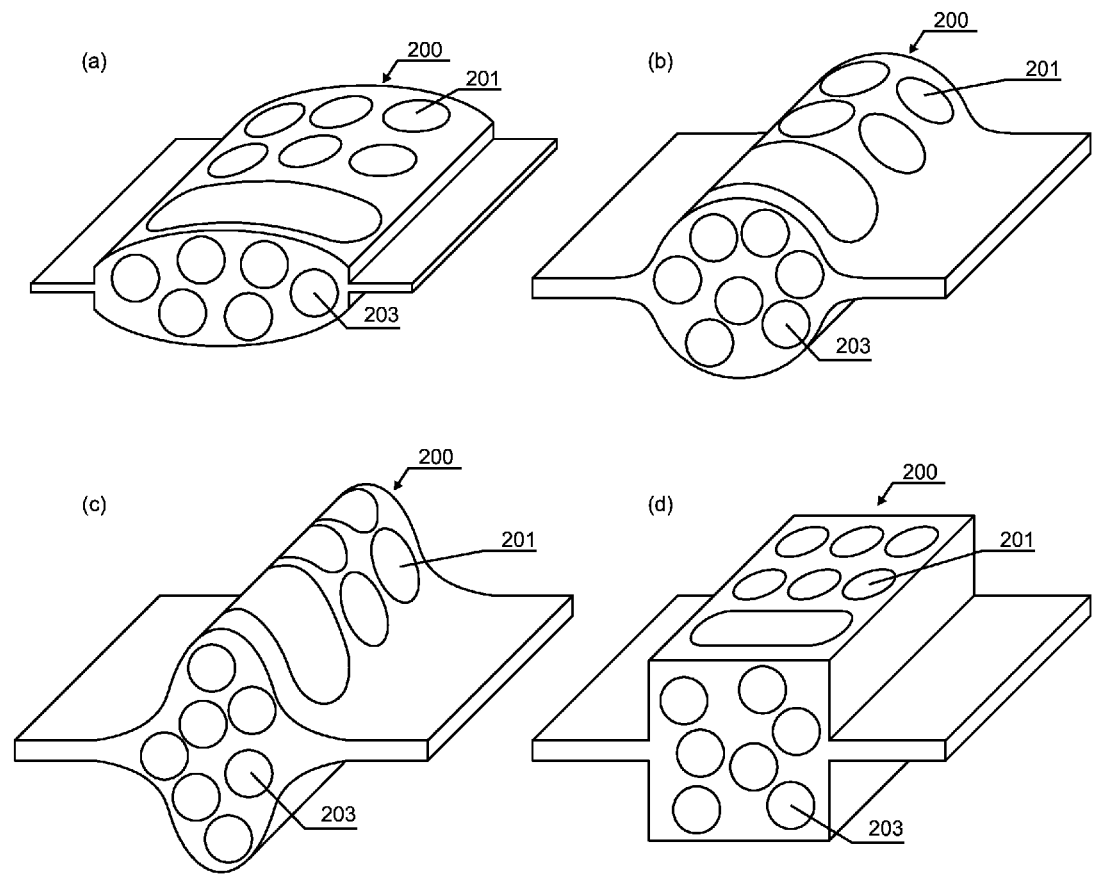
FIGS. 17A to 17D are cross-sectional views each depicting the guide body of sixth embodiments.

FIG. 15A illustrates an example of the embodiment in which the guide body 200 has a circular cross-section. FIG. 15B illustrates another example of the embodiment in which the guide body 200 has a triangular cross-section in an embodiment. FIG. 15C illustrates another example of the embodiment in which the guide body 200 has an octagonal cross-section in an embodiment. FIG. 15D illustrates another example of the embodiment in which the guide body 200 has a hexagonal cross-section in an embodiment in FIG. 15D. Each of them is arranged in the intake passage 300 by a pair of ribs 210. The pair of ribs 210 may be fixed in the intake passage 300 by press fitting or by engagement with recesses.

Also, the pair of ribs 210 may be provided with holes. In the present embodiment, the surface area of the guide body 200 is secured to enable further generation of turbulence.

(Fifth Embodiment)

Configurations of the guide body in a fifth embodiment are illustrated in FIGS. 16A through 16D. These are cross-sectional views of the guide bodies. In this fifth embodiment the guide body is basically square or rectangular and has a series of holes that run in at least two directions. That is, there are holes that can run horizontally or with the length of the guide body and there are also holes that run perpendicular to the holes running the length of the guide body. These holes need not be of any specific size, shape or diameter. In fact, they need not all be circular as the same result may occur if the holes are oblong in shape. The holes that are perpendicular to each other may or may not join each other or they might join each other. The embodiment is also not specific as to the orientation, angle, degree, or size of the hole. Basically, it is up to the imagination of the designer when creating and configuring these orifices. These holes act as the holes described above in that they cause disruption of the air flow and the unexpected result is that this configuration improves an atomizing rate of an air-fuel mixture, improves combustion efficiency and fuel consumption, and reduces harmful components in exhaust gas.

(Sixth Embodiment)

In the sixth embodiment the guide body 200 is conical, cubic, oblong shaped, spherical, or any other configuration or shape. In this embodiment the guide body is more three dimensional than in the previous embodiments. In the previous embodiments the guide body is generally flat or flat but curved. However, in this embodiment the guide body is more but it still maintains the feature of having multiple holes 201, as shown in FIG. 17A through 17D. The guide body 200 is still disposed in the intake passage located downstream from a fuel supplying device. Although the guide body 200 of the present embodiment differs from those of the first to fourth embodiments in terms of a conical, cubic, spherical, or any other shape, it is configured in a similar manner in other respects. Thus, description is omitted.

In this sixth embodiment it can be seen in FIGS. 17A through 17D that the guide body or bodies placed in the intake passages can be of multiple and varied configurations. As is seen from the figures these configurations can be cubic, cylindrical, spherical, conical, trapezoidal or any other imaginable configuration. Basically, any configuration that will disturb the air flow rate in the passage will work. Additionally, it has been learned that the air disruption is most effective when the guide body is disposed in the intake passage located downstream from the fuel supply device and where a volume ration of the guide body relative to the intake passage is ranged between three volume percent and fifteen volume percent. It is additionally advantageous when the guide body has at least one hole in the guide body. Thus, it is preferable to have at least one hole running through the body and even more beneficial to have a variety of holes running in multiple directions. Again, as above, there is no set rule as to the size, shape, angle, configuration, or orientation of the holes as long as they are in the guide body. When possible the holes may also be perpendicular to each other or any other orientation. As can be seen, for example, in FIG. 17D, the cubic design has holes running both the length of the cube and perpendicular to the length. There is also an oblong hole on one side. These holes may intersect with each other or they may miss each other entirely. Again, it is basically up to the imagination of the designer when creating and configuring these orifices in the guide body. These holes act as the described holes above in that they cause disruption of the air flow and the unexpected result is that this configuration improves an atomizing rate of an air-fuel mixture, improves combustion efficiency and fuel consumption, and reduces harmful components in exhaust gas.

It has been further learned that the air disruption is most effective when the guide body is disposed in the intake passage located downstream from the fuel supply device and where a volume ration of the guide body relative to the intake passage is ranged between twenty volume percent and forty eight volume percent. Again, it is additionally advantageous when the guide body has at least one hole in the body.

It is also possible to have multiple guide bodies within the intake passages to increase the disruption of the air flow and results in the same, unexpected results, and that is, the air-fuel mixture atomized in the two stages is supplied, combustion efficiency and fuel consumption may be improved. Ultimately, this configuration improves an atomizing rate of an air-fuel mixture, improves combustion efficiency and fuel consumption, and reduces harmful components in exhaust gas.

The present disclosure is an engine mounted in a vehicle such as a two-wheeled motor vehicle, is applied to an intake apparatus of a 2-stroke engine or a 4-stroke engine, improves an atomizing rate of an air-fuel mixture, improves combustion efficiency and fuel consumption, and reduces harmful components in exhaust gas.

It is readily apparent that the above-described embodiments have the advantage of wide commercial utility. It should be understood that the specific form of the invention hereinabove described is intended to be representative only, as certain modifications within the scope of these teachings will be apparent to those skilled in the art.

What I claim is:

1. An intake apparatus of an engine provided with a fuel supplying device for supplying fuel into an intake passage, comprising:
    a hollowed, 3 dimensional guide body having multiple holes disposed on the surfaces
    the guide body is located within the intake passage located downstream from the fuel supplying device, wherein
    separated passages formed by the guide body are formed in the intake passage.

2. The intake apparatus of claim 1 where the guide body has a stepped portion extending in a direction intersecting with a direction of a flow of intake air.

3. The intake apparatus of claim 2, wherein
    on the outer surface of the guide body a plurality of the stepped portions are arranged in parallel.

4. The intake apparatus of claim 1, wherein
    on the inner surface of the guide body a plurality of the stepped portions are arranged in parallel.

5. The intake apparatus of claim 1, wherein
    each of the holes is a choking hole whose passage cross-sectional area is narrowed on one side.

6. The intake apparatus of claim 5, wherein
    the choking hole is gradually narrowed from a large-diameter passage to a small-diameter passage.

7. The intake apparatus of claim 5, wherein
    the choking hole includes a large-diameter passage portion and a small-diameter passage portion.

8. The intake apparatus of claim 5, wherein
    the choking holes are arranged so that narrowed sides the respective choking holes are alternatively located on opposite sides of the guide body.

9. The intake apparatus of claim 1, wherein
the holes located upstream of the flow of the intake air are larger and the holes located downstream of the flow of the intake air are smaller.

10. The intake apparatus of claim 1, wherein
the multiple holes located upstream of the flow of the intake air are different from the multiple holes located downstream of the flow of the intake air in size.

11. The intake apparatus of claim 1, wherein the guide body has a curved cross-section.

12. The intake apparatus of claim 3 or 4, wherein the holes are formed at parts displaced from the stepped portion.

13. The intake apparatus of claim 1, wherein
the guide body having the multiple holes is disposed in the intake passage of a 4-stroke engine.

14. The intake apparatus of claim 1, wherein
the guide body having the multiple holes is disposed in the intake passage of a 2-stroke engine.

15. The intake apparatus of claim 1, wherein
the holes are through holes where passage cross-sectional areas of the respective holes are equal to one another.

16. An intake apparatus of an engine provided with a fuel supply device for supplying fuel into an intake passage, comprising:
a hollowed, 3 dimensional guide body disposed in the intake passage located downstream from the fuel supply device,
separated passages formed by the guide body are in the intake passage and wherein
a volume ratio of the guide body relative to the intake passage is ranged between 3 volume percent and 15 volume percent.

17. The intake apparatus of claim 16 wherein the guide body has at least one hole therein.

18. The intake apparatus according to claim 17, wherein
a volume ratio of the total holes in the intake passage relative to the guide body is ranged between 20 volume percent and 48 volume percent.

19. The intake apparatus according to claim 18, wherein said intake apparatus has multiple guide bodies.

20. The intake apparatus of claim 17 wherein said guide body has multiple holes in different directions.

21. The intake apparatus according to claim 17, wherein said intake apparatus has multiple guide bodies.

22. The intake apparatus of claim 17 wherein said holes run horizontally and perpendicular to the horizontal hole.

23. The intake apparatus according to claim 16, wherein said intake apparatus has multiple guide bodies.

24. The intake apparatus according to claim 16, wherein the guide body is disposed in the intake passage of a 4-stroke engine.

25. The intake apparatus of claim 16 wherein the guide body is disposed in the intake passage of a 2-stroke engine.

* * * * *